United States Patent [19]

Welch et al.

[11] Patent Number: 4,472,523
[45] Date of Patent: Sep. 18, 1984

[54] ZIRCONIUM-TITANIUM CATALYZED OLEFIN POLYMERIZATION

[75] Inventors: Melvin B. Welch; Richard E. Dietz, both of Bartlesville, Okla.

[73] Assignee: Phillips Petroleum Company, Bartlesville, Okla.

[21] Appl. No.: 485,791

[22] Filed: Apr. 18, 1983

Related U.S. Application Data

[62] Division of Ser. No. 266,690, May 22, 1981, Pat. No. 4,396,747.

[51] Int. Cl.$^3$ ............................................. C08F 4/64
[52] U.S. Cl. ................................... 502/111; 502/104; 502/110; 502/113
[58] Field of Search ........... 252/429 C, 431 R, 429 B; 502/111, 104, 113, 110

[56] References Cited

U.S. PATENT DOCUMENTS

| | | | |
|---|---|---|---|
| 4,109,071 | 8/1978 | Berger et al. | 252/429 C X |
| 4,218,339 | 8/1980 | Zucchini et al. | 252/431 R X |
| 4,310,648 | 1/1982 | Shipley et al. | 252/429 C X |

Primary Examiner—Patrick Garvin
Attorney, Agent, or Firm—Bernhard H. Geissler

[57] ABSTRACT

Olefins such as ethylene can be polymerized in high productivities using a catalyst system wherein one catalyst component comprises a precipitated complex of zirconium tetrahydrocarbyloxide and/or titanium tetrahydrocarbyloxide and dihydrocarbylmagnesium. The productivity of the preferred catalyst containing both zirconium and titanium has been found to be substantially higher than the productivity of those catalysts obtained from either only $Zr(OR')_4$ or only $Ti(OR'')_4$ and second catalyst component comprises at least one organometallic compound of a metal selected from the Groups I-III of the Mendeleev Periodic Table.

28 Claims, No Drawings

ZIRCONIUM-TITANIUM CATALYZED OLEFIN POLYMERIZATION

This application is a division of application Ser. No. 266,690, filed May 22, 1981, and now U.S. Pat. No. 4,396,747.

BACKGROUND OF THE INVENTION

This invention relates to the polymerization of olefins with catalysts comprising a transition metal compound and a Group I–III cocatalyst organometallic compound. More specifically, the present invention relates to new compositions of matter, their use in olefin polymerization, and to olefin polymerization catalysts containing these compositions.

It is well known in the art that ethylene or alpha olefins and mixtures of such olefins can be polymerized using catalysts based on transition metal complexes and cocatalyst composition such as aluminum alkyls. These polymerization processes can be carried out in suspension, in solution, or in the gas phase. Among the transition metals, titanium is the most widely used metal in the catalyst component; whereas aluminum is the most widely used Group I–III metal for the cocatalyst compound.

Very many variations and modifications of the catalyst systems and the polymerization process have been described in the art. It is a remaining goal in this field of technology to increase the productivity of a polymerization catalyst. The ideal catalyst would be one having such a high productivity that the catalyst residues do not have to be removed from the polymer.

THE INVENTION

It is thus one object of this invention to provide a new composition of matter that is useful in the art of olefin polymerization.

Another object of this invention is to provide a new catalyst component which in an olefin polymerization system as described results in high productivities.

Still another object of this invention is to provide a process for producing such new compositions and catalyst components. A yet further object of this invention is to provide a new process for polymerizing and copolymerizing olefins with high productivities.

These and other objects, advantages, details, features, and embodiments of this invention will become apparent to those skilled in the art from the following detailed description of the invention and the appended claims.

In accordance with this invention a catalyst component useful in olefin polymerization is provided which is obtained by coprecipitating metal tetrahydrocarbyloxide-dihydrocarbylmagnesium with a titanium tetrahalide; "metal" refers to zirconium and/or titanium.

In accordance with a preferred embodiment of this invention it has been found that a catalyst component obtained by coprecipitating a zirconium tetrahydrocarbyloxide-titanium tetrahydrocarbyloxide-magnesium alkyl compound with a titanium tetrahalide constitutes a catalyst component for olefin polymerization which has even better productivity than similar components based on titanium tetrahydrocarbyloxide alone or based on zirconium tetrahydrocarbyloxide alone.

INTERMEDIARY

In accordance with a first embodiment, therefore, a new composition of matter is provided in accordance with this invention. This new composition of matter is obtained by reacting the following compounds:
a. $Zr(OR')_4$ and/or $Ti(OR'')_4$
b. $MgR_2'''$ In this formula R', R'', R''' are hydrocarbyl radicals of 1–20 carbon atoms. Preferably these hydrocarbyl radicals are alkyl radicals having 1 to about 10 carbon atoms with identical radicals in a given compound. The new composition is an intermediate compound useful for the production of a catalyst component, which catalyst component is useful together with a cocatalyst for olefin polymerization. The most preferred imtermediate is the one obtained by reacting $Zr(OR')_4$ and $Ti(OR'')_4$ and $MgR_2'''$. The starting materials are preferably employed in quantities so that the mole ratio of $MgR_2'''$ to $Ti(OR'')_4$ or
$MgR_2'''$ to $Zr(OR')_4$ or
$MgR_2'''$ to $Ti(OR'')_4 + Zr(OR')_4$ is in the range of about 0.5:1 to about 2:1. For the preferred three component intermediate the Ti:Zr ratio will generally be in the range of about 1:10 to 10:1, most preferably in the range of about 0.3:1 to 3:1.

It is presently preferred to employ the zirconium alkoxide and the titanium alkoxide pre-mixed and to react this mixture with the magnesium alkyl. The zirconium alkoxide may also be employed in the complex form with an alcohol, i.e. the zirconium alkoxide may be employed as $Zr(OR')_4 \cdot nR^{IV}OH$, wherein $R^{IV}OH$ represents an alcohol, preferably an alkanol having 1–10 carbon atoms, and n is in the range of 0 to 2. Similarly, the titanium alkoxide can be employed in a form complexed with an alcohol, i.e. in the form $Ti(OR'')_4 \cdot nR^VOH$, wherein $R^VOH$ again is an alcohol, preferably an alkanol with 1–10 carbon atoms. R' and $R^{IV}$ as well as R'' and $R^V$ constitute the same radicals.

$Ti(OR'')_4$ and $Zr(OR')_4$ can be made by reacting the corresponding tetrachloride, e.g. $TiCl_4$, with an alcohol, e.g. an alkanol having 1–10 carbon atoms, in the presence of a HCl acceptor such as $NH_3$ as shown below; e.g.:

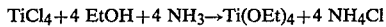

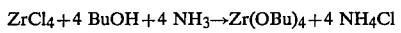

$(Et = -C_2H_5, Bu = -n-C_4H_9)$

If an excess of the alcohol is present, then the product alkoxide can be solvated with the alcohol. The alcohol is easier to remove from the solvated $Ti(OR'')_4$ then the solvated $Zr(OR')_4$. Thus, in complexes containing alcohols, it is desirable or essential that the alcohol complexed is the same used in preparing the alkoxide as shown above.

The lower Ti alkoxides such as titanium tetraisopropoxide, $Ti(O-i-C_3H_7)_4$, can react with a higher alcohol to form the corresponding alkoxide, e.g. $Ti(O-i\ C_3H_7)_4 + 4\ BuOH \rightarrow Ti(OBu)_4 + 4\ i-C_3H_7OH$. If the zirconium alkoxides rect similarly, then the alcohol solvated complexes must be tied to the alcohol used in their preparation as shown in the two equations above. References for the preparation are given in Kirk-Othmer, Encyclopedia of Chemical Technology, Second Edition with volumes and pages as:

$Ti(OR'')_4$ vol. 20, pp. 451,452
$Zr(OR')_4$ vol. 22, pp. 636,637

Appropriate dihydrocarbylmagnesium compounds $MgR_2'''$ are not limited by the number of carbon atoms in the hydrocarbyl groups R''' excpet for possible practical considerations. Suitable and preferred dihydrocarbylmagnesium compounds are those wherein the radicals R''' which can be the same or different, are hydrocarbyl radicals selected from alkyl, cycloalkyl, aryl, alkaryl, aralkyl, and alkenyl groups having from 1 to about 20 carbon atoms per molecule. Exemplary compounds include dimethyl-magnesium, dibutylmagnesium, particularly n-butyl-sec-butylmagnesium, dipentylmagnesium, didodecylmagnesium diphenylmagnesium, dibenzylmagnesium, dicyclohexylmagnesium, di(4-t-butylphenyl)magnesium and diisopropenylmagnesium. Mixtures of such dihydrocarbylmagnesium compounds can also be employed.

The titanium tetrahydrocarbyloxides useful in accordance with this invention have the formula Ti(OR'')$_4$. Among the hydrocarbyl radicals R'' as defined which can be the same or different, a preferred group is consisting of alkyl, cycloalkyl, aryl, alkaryl, and aralkyl. Again the number of carbon atoms in those hydrocarbyl radicals R'' is limited only by practical consideration and usually these radicals R'' will contain 1 to 20 carbon atoms per radical. Those titanium tetrahydrocarbyloxides in which the hydrocarbyl group contains from 1 to 10 carbon atoms per radical are most often employed and preferred because these compounds are more readily available. Examples for suitable titanium tetrahydrocarbyloxides are titanium tetramethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

The zirconium tetrahydrocarbyloxide used in accordance with this invention can generally be characterized by the formula Zr(OR')$_4$ wherein the radicals R' which can be the same or different are hydrocarbyl radicals. The number of carbon atoms in the hydrocarbyl radicals R' is not limited except for practical considerations and the individual radicals R' will usually have 1 to about 20 carbon atoms per radical. Within the above defined group of radicals R' the alkyl, cycloalkyl, aryl, alkaryl and aralkyl radicals constitute the preferred group; preferably the hydrocarbyl radicals R' have 1 to about 10 carbon atoms since the corresponding zirconium compounds are more readily available. Examples of useful zirconium tetrahydrocarbyloxides are zirconium tetramethoxide, zirconium tetraethoxide, zirconium tetra-n-butoxide, zirconium tetrahexyloxide, zirconium tetradecyloxide, zirconium tetraeicosyloxide, zirconium tetracyclohexyloxide, zirconium tetrabenzyloxide, zirconium tetra-p-tolyloxide and zirconium tetraphenoxide.

In addition to the tetrahydrocarbyloxides of titanium and zirconium also the alcohol complexes thereof can be used wherein the complex contains up to two moles of alcohol as defined above.

The present invention also relates to a process of making the intermediate or precursor, namely the titanium tetrahydrocarbyloxide and/or zirconium tetrahydrocarbyloxide-dihydrocarbylmagnesium compound. This process resides in reacting the two or three compounds defined in quantities within the relative ranges given above. This reaction is preferably carried out in a hydrocarbon diluent. The hydrocarbon diluent or solvent is inert, i.e. it does not chemically react with the dissolved components. Examples of the diluent or solvent include n-pentane, n-hexane, n-heptane, methylcyclohexane, toluene, xylenes mixtures of isoparaffins and mixtures of two or more of these diluents.

The reaction conditions for the reaction between the two or three compounds, namely the titanium tetrahydrocarbyloxide and/or the zirconium tetrahydrocarbyloxide and the dihydrocarbylmagnesium, are such that the diluent employed remains essentially in the liquid phase. Typical operating conditions for this first reaction are as follows:

pressure about 10 to about 1000 psia (0.069 to 6.9 MPa)

temperature about 50° to about 150° F. (10° to 65° C.)

reaction time about 5 to about 120 minutes.

The reaction is carried out under anhydrous conditions, i.e., essentially water free. Similarly other ingredients which may interfere with the reaction between the metal compounds, such as free oxygen, are kept away from the reaction mixture.

The result of the first reaction is a solution of a complex formed between the zirconium tetrahydrocarbyloxide, and/or the titanium tetrahydrocarbyloxide, and the dihydrocarbylmagnesium.

The solution of the complex obtained is also believed to be a novel composition of matter. This solution constitutes a preferred embodiment of the invention.

FIRST CATALYST COMPONENT

From the zirconium tetrahydrocarbyloxide and/or titanium tetrahydrocarbyloxide-dihydrocarbylmagnesium complex, a first catalyst component is produced. This catalyst component as well as the process to produce it constitutes further embodiments of this invention. The first catalyst component in accordance with this invention is obtained by reacting a solution of the complex described above with a titanium tetrahalide. This reaction results in the forming of a precipitate which after washing to remove any excess titanium tetrahalide constitutes the first catalyst component. Typically, about 0.1 to about 1 gram of titanium tetrachloride is used per gram of the complex (dry weight basis). Typical, but non-critical operation conditions for the precipitating step include:

precipitation temperature 50° to 150° F. (10° to 65° C.)

pressure 10 to 1000 psia (0.069 to 6.9 MPa)

washing cycles 2 to 10.

The typically employed washing liquid is a hydrocarbon solvent in which the titanium tetrahalide employed is soluble. Examples for such solvents include n-pentane, n-hexane, n-heptane, methylcyclohexane, toluene, xylenes and mixtures thereof.

CATALYST SYSTEM

The precipitate obtained is the first catalyst component of the two-component catalyst system of this invention. The second catalyst component or cocatalyst comprises an organometallic compound of an element from Groups I-III of the Mendeleev Periodic Table. These compounds are well known cocatalysts and are in detail described for instance in the U.S. Pat. No. 4,199,475, which disclosure hereby is incorporated by reference. Among those cocatalysts the aluminum alkyl compounds are presently preferred, particularly the trialkylaluminum compositions which are advantageously used in the process of this invention. The two component catalyst constitutes another embodiment of this invention.

POLYMERIZATION PROCESS

A still further embodiment of this invention resides in a polymerization process. In this process olefins having 2 to 10 carbon atoms are polymerized by contacting these olefins, preferably in the presence of a diluent, with the catalyst defined above under polymerization condition.

The olefins that can be polymerized in accordance with the process of this invention include ethylene, propylene, 1-butene, 1-pentene, 1-hexene, 1-heptene, 1-octene, 1-nonene and 1-decene. The polymerization process is particularly applicable to ethylene, propylene, and to mixtures of ethylene and a small quantity of a comonomer having 3 to 10 carbon atoms. A preferred comonomer for this process is a mono-1-olefin having 3 to 10 carbon atoms, particularly 1-butene and 1-hexene.

Typical polymerization conditions are chosen so that the diluent and monomer remain in the liquid phase and are therefore primarily dependent upon the monomer and diluent employed. Ranges for the polymerization conditions are given following:

Polymerization temperature about 60° to about 350° F. (15° to 177° C.).

Pressure about 10 to about 1000 psia (0.069 to 6.9 MPa). The polymerization is as always carried out in the absence of catalyst poisons and other ingredients detrimental to the polymerization itself. Particularly the polymerization is carried out in the absence of free oxygen and in the absence of water. Nitrogen and other inert gases can be used to protect the reaction and also to dilute and convey the olefin to the polymerization reactor.

The following examples are given to further illustrate the invention without undue limitation of its scope.

EXAMPLE I

Catalyst Preparation

Into a 500 mL round bottom flask equipped with a magnetic stirrer and a reflux column there were placed 3.8 mL (4.0 g) of zirconium n-butoxide-butanol complex $Zr(O-n-C_4H_9)_4 \cdot (n-C_4H_9OH)$ and 4.2 mL (4.0 g) of titanium tetraisopropoxide in 350 mL n-hexane. To this solution 25 mL of a 1.12 N (0.56 molar) solution of dibutylmagnesium in a mixture of isoparaffins containing 8 or 9 carbon atoms (Isopar E commercially avaiable from Exxon Co., see U.S. Pat. No. 4,198,315, the examples) were added. A dark green solution resulted. To this solution 20 mL of titanium tetrachloride was slowly added. Immediately precipitation occurred. The mixture was refluxed one and one-half hours, cooled, and the mother liquor decanted. The precipitate was washed once with n-hexane and twice with n-pentane, using about 50 mL portions of hydrocarbon per wash. The resulting product was dried over a warm water bath. 10.5 g of a light tan solid were recovered.

EXAMPLE II

Catalyst Preparation

Into a 500 mL round-bottom flask containing about 350 mL of n-hexane, 2.1 mL (2.0 g) of titanium tetraiosopropoxide was added. To this solution 50 mL of the 0.56 M dibutylmagnesium reagent was added. The solution turned green and then brown. The color was too intense to determine if a precipitate had formed. Slowly 20 mL of titanium tetrachloride was added. The solution was refluxed for one hour and cooled. Since the solid did not settle, the solvent was evaporated to dryness. 15.7 g of a brown solid were recovered.

EXAMPLE III

Catalyst Preparation

Into a 500 mL round-bottom flask 3.0 mL of the same zirconium tetra-n-butoxide-butanol complex in an n-hexane solution as used in Example I were placed. The zirconium butoxide-alcohol complex is sold by the Thiokol Corp., Ventron Div., Danvers, Mass. To this solution 50 mL of dibutylmagnesium (0.56 molar in Isopar E, see Example I) was added. The solution turned deep red with no visible sign of precipitation. To this red solution 6.0 mL of titanium tetrachloride was slowly added. A brown solid precipitate formed immediately. The flask was refluxed for one hour. The precipitate did not settle out and the solvent was evaporated using a heating mantle and finally a warm water bath. The solid yield was 10.1 g.

EXAMPLE IV

Ethylene Polymerization

A one gallon autoclave was charged with 2 L of isobutane, 0.0180 g of the catalyst produced in Example I, and 3.0 mL of a 15 weight percent triethylaluminum solution in n-heptane. The quantity of triethylaluminum was equivalent to about 3 millimoles triethylaluminum. The autoclave was closed and the contents were brought up to a temperature of approximately 70° C. Thereafter, ethylene was passed into the reactor at a partial pressure of 100 psi. The polymerization was allowed to continue for one hour. Thereafter, the ethylene was turned off and the autoclave was vented. 146 g of solid polymer product was obtained. This amounted to a productivity of 8.11 kg polymer/g catalyst/hr.

EXAMPLE V

Ethylene Polymerization

The catalyst preparation described in Example I was essentially repeated and 0.0460 g of the so-produced precipitate were charged together with 2 L of isobutane and 3.0 mL of a 15 weight percent solution of triethylaluminum in n-heptane to a 1 gallon autoclave. The polymerization was then repeated essentially as described in the previous example, with the exception, however, that the polymerization was at 80° C. This polymerization yielded 455.0 g of a solid polymer product which translated into a productivity of 9,89 kg polymer/g cat/hr.

EXAMPLE VI

Ethylene Polymerization

Proceeding essentially as in Example V, 0.0254 g of catalyst prepared in accordance with Example II was placed together with 2 L of isobutane and 3.0 mL of a 15 weight percent triethylaluminum solution in n-heptane. The polymerization run produced 68 g of a solid polymer product which translates into a productivity of 2.68 kg polymer/g cat/hr.

EXAMPLE VII

Ethylene Polymerization

The catalyst production described in Example II was essentially repeated under the same conditions and 0.0268 g of the solid product was placed into a one-gallon autoclave together with 3.0 cc of a 15 weight percent triethylaluminum solution in n-heptane and 2 L of isobutane. The polymerization run was essentially carried out in the same manner as described in Example V and 95.0 g of a solid polymer product was obtained. This translates into a productivity of 3.54 kg polymer/g cat/hr for this run.

EXAMPLE VIII

Ethylene Polymerization

Into a one-gallon autoclave 0.0199 g of the catalyst product prepared in accordance with Example III was placed together with the same quantity of triethylaluminum and isobutane described in connection with the previous examples. The polymerization was carried out as described at a polymerization temperature of 80° C. for thirty minutes. The solid polymer obtained weighed 20 g. The latter translates into a productivity of 1.00 kg polymer/g cat./30 minutes or, assuming a linear relationship, a productivity of 2.00 kg polymer/g cat/hr.

EXAMPLE IX

Ethylene Polymerization

The catalyst preparation of Example III was essentially repeated and 0.0276 g of the so obtained catalyst was introduced into a one-gallon autoclave together with the same quantities of triethylaluminum and isobutane as in the other examples. The polymerization of ethylene was carried out as described in connection with the other examples for one hour at a temperature of 80° C. and a reactor pressure of 295 psia (2.03 Mpa). The solid polymer obtained weighed 53.0 g which translates into a productivity of 1.92 kg polymer/g cat/hr.

The results of the above examples are summarized in the following table.

TABLE

| Cat. Wt. g | Minimal Reactor Temp. °C. | Polymerization Time hr | Average Reactor Pressure psia | Polymer Yield g | Productivity g polymer/g cat/hr | Remarks |
| --- | --- | --- | --- | --- | --- | --- |
| .0180 | 70 | 1.0 | 275 | 146 | 8110 | invention |
| .0460 | 80 | 1.0 | 295 | 455 | 9890 | invention |
| .0254 | 80 | 1.0 | 300 | 68 | 2680 | invention |
| .0268 | 80 | 1.0 | 295 | 95 | 3540 | invention |
| .0199 | 80 | 0.5 | 335 | 20 | 2000 | invention |
| .0276 | 80 | 1.0 | 295 | 53 | 1920 | invention |

The results of these examples show that the new catalysts effectively polymerize ethylene. Furthermore, an unexpected improvement in productivity is obtained with a catalyst containing zirconium and titanium complex coprecipitated. Since the productivity is based on 1 g of catalyst, one would have expected the productivity of a mixed catalyst comprising zirconium and titanium to be somewhere between the productivities of the titanium catalyst and the zirconium catalyst. Surprisingly, however, a very substantially higher productivity was obtained with the mixed catalyst defined above.

Reasonable variations and modifications which will become apparent to those skilled in the art can be made in this invention without departing from the spirit and scope thereof.

We claim:

1. A process to produce a zirconium-titanium-magnesium complex comprising reacting the following components:

(a) $Zr(OR')_4$ and $Ti(OR'')_4$
(b) $MgR_2'''$ wherein $R'$, and $R''$ and $R'''$ are hydrocarbyl radicals of 1 to about 20 carbon atoms.

2. Process of claim 1 wherein $Ti(OR'')_4$ and $Zr(OR')_4$ are premixed and the mixture so obtained is reacted with compound (b).

3. Process of claim 1 wherein $Zr(OR')_4$ is used in the form of $Zr(OR')_4 \cdot nR^{IV}OH$ wherein $R^{IV}$ is a hydrocarbyl radical having 1 to 10 carbon atoms.

4. Process for producing a catalyst component comprising mixing a solution of a composition produced in accordance with claim 1 in a solvent with a titanium tetrahalide to obtain a precipitate and recovering the precipitate as said catalyst component.

5. Process for producing a catalyst component comprising mixing a solution of a composition produced in accordance with claim 2 in a solvent with a titanium tetrahalide to obtain a precipitate and recovering the precipitate as said catalyst component.

6. Process for producing a catalyst component comprising mixing a solution of a composition produced in accordance with claim 3 in a solvent with a titanium tetrahalide to obtain a precipitate and recovering the precipitate as said catalyst component.

7. Process in accordance with claim 4 comprising separating the precipitate from the solution and washing the precipitate.

8. Process in accordance with claim 5 comprising separating the precipitate from the solution and washing the precipitate.

9. Process in accordance with claim 6 comprising separating the precipitate from the solution and washing the precipitate.

10. Process in accordance with claim 7 wherein said washing is carried out with a hydrocarbon solvent in which the titanium tetrahalide is soluble.

11. Process in accordance with claim 8 wherein said washing is carried out with a hydrocarbon solvent in which the titanium tetrahalide is soluble.

12. Process in accordance with claim 9 wherein said washing is carried out with a hydrocarbon solvent in which the titanium tetrahalide is soluble.

13. Process in accordance with claim 4 wherein said titanium tetrahalide is titanium tetrachloride.

14. Process in accordance with claim 5 wherein said titanium tetrahalide is titanium tetrachloride.

15. Process in accordance with claim 6 wherein said titanium tetrahalide is titanium tetrachloride.

16. Process in accordance with claim 7 wherein said titanium tetrahalide is titanium tetrachloride.

17. Process in accordance with claim 8 wherein said titanium tetrahalide is titanium tetrachloride.

18. Process in accordance with claim 9 wherein said titanium tetrahalide is titanium tetrachloride.

19. Process in accordance with claim 10 wherein said titanium tetrahalide is titanium tetrachloride.

20. Process in accordance with claim 11 wherein said titanium tetrahalide is titanium tetrachloride.

21. Process in accordance with claim 12 wherein said titanium tetrahalide is titanium tetrachloride.

22. Composition of matter produced in accordance with claim 1.

23. Composition of matter produced in accordance with claim 2.

24. Composition of matter produced in accordance with claim 3.

25. Catalyst component produced in accordance with claim 4.

26. Catalyst component produced in accordance with claim 6.

27. Olefin polymerization catalyst comprising components A and B wherein component A is a component in accordance with claim 22 and wherein component B is a cocatalyst of one or more organometallic compounds of at least one metal of Groups I, II, or III of the Mendeleev Periodic Table.

28. Olefin polymerization catalyst comprising components A and B wherein component A is a component in accordance with claim 23 and wherein component B is a cocatalyst of one or more organometallic compounds of at least one metal of Groups I, II, or III of the Mendeleev Periodic Table.

* * * * *